R. V. DE GUINON.
Lamp.
No. 8,630.
Patented Jan. 6, 1852.
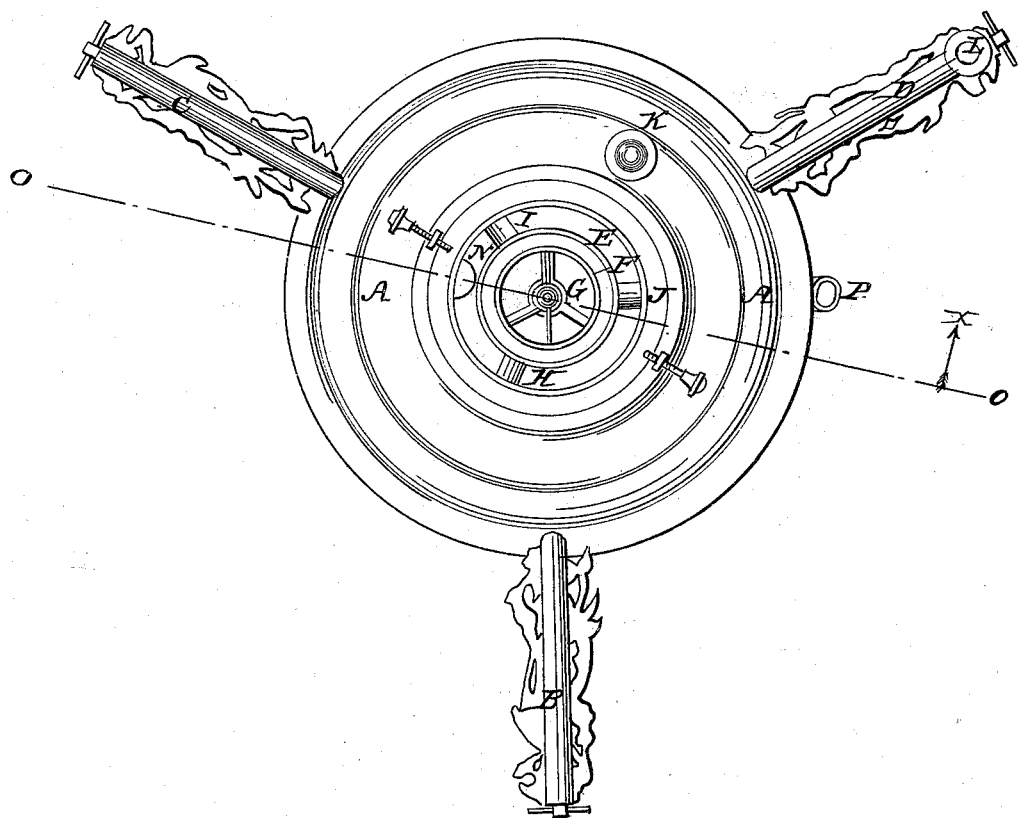
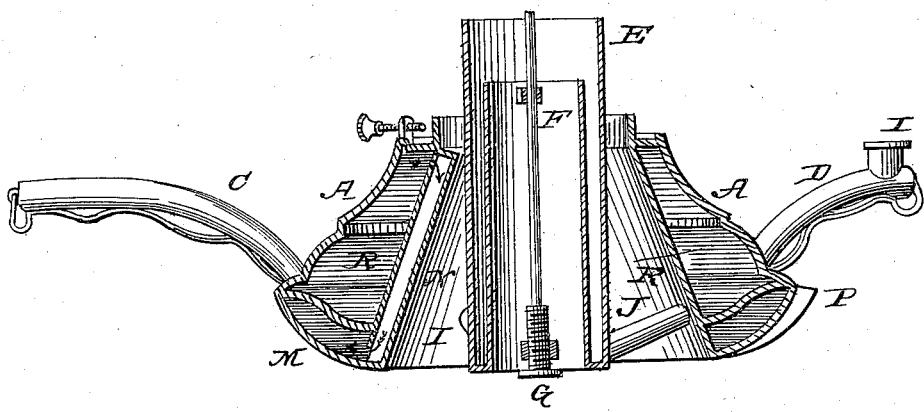
Fig. 2

UNITED STATES PATENT OFFICE.

R. V. DE GUINON, OF WILLIAMSBURGH, NEW YORK.

CAMPHENE-LAMP.

Specification of Letters Patent No. 8,630, dated January 6, 1852.

*To all whom it may concern:*

Be it known that I, R. V. DE GUINON, of Williamsburgh, in the county of Kings and State of New York, have invented certain new and useful Improvements in Lamps for Burning Camphene and other Fluids; and I do hereby declare that the following is a full, clear, and exact description of the same, reference being had to the accompanying drawings, forming part of this specification, in which—

Figure 1, is a top view or plan of an ordinary chandelier or hanging lamp with my improvements attached. Fig. 2, is a sectional elevation of the same taken through the line *o, o,* Fig. 1, and looking in direction of the arrow *x*.

The same letters of reference denote similar parts in both of the figures.

The object of my invention is to obviate explosion, and the nature of it consists in constructing the reservoir of the lamp with a false bottom or chamber communicating with which and the reservoir, near the top, is a tube or passage that serves to receive and conduct the camphene, or other fluid, as it increases in volume by expansion.

To enable others skilled in the art to make and use my invention, I will proceed more minutely to describe it.

A, A, is the reservoir or body of an ordinary chandelier or hanging lamp, which may be supported by chains attached to rings at the extremities of the carrying arms B, C, D.

E is the wick-tube or chamber having concentrically an inner tube F, and the usual adjusting screw G.

H, I, J, are the supply tubes from the reservoir A A, to the wick tube or chamber E, and K is the ordinary feed tube, in the place of which latter however a feed branch L may be adopted, situated near the extremity of one of the carrying arms, which is hollow and serves to form a passage to the reservoir, so that by removing the outlet or feed further from the flame than is the case with the tube K, the liability to explosion is decreased. The reservoir or body A A is made with a false bottom which serves to form a circular chamber M that is altogether distinct from the body of the reservoir except where connected by the tube or passage N which establishes a communication between the reservoir A A near the top and chamber M with which it communicates or serves as a spout to.

R R, Fig. 2, represents the body of camphene in the reservoir of the lamp when filled.

The effects produced by my improvements will be best understood by prefacing the following description of the advantages derived with a brief review of the causes of explosion in lamps where camphene and other similar fluids are used: Camphene, it is found by experiment, expands one-ninth or thereabouts its volume by exposure to heat of, say 190° Fahrenheit. A less degree of expansion is induced by a lower temperature, and when the lamp is perfectly filled with the fluid, an increase in the temperature of the atmosphere is of itself sufficient to cause an explosion that will induce the fluid to overflow the feed and so be exposed on the outside of the lamp. This being the case with a fluctuation in the state of the atmosphere, it may readily be imagined how a similar but much larger effect is produced when the lamp is burning, and a strong degree of heat is conveyed to the fluid in the reservoir by radiation from the flame and the conducting properties of the surrounding materials. The fluid thus expanded &c., (in the ordinary form of lamps) forced out from the reservoir through the feed branch K, causing it to be exposed on the exterior of the reservoir A A, is rendered by its expanded volume lighter, or more to approximate a volatile nature as it were, which, together with an affinity that the fluid thus exposed has for the gaseous compounds emitting from the wick, or saturated condition of the wick itself, and probably, in addition, as induced through the draught and rarefaction produced by the flame, or some other cause or causes, induce or lead the exposed fluid to flow up and toward the wick, the fluid creeping as it were up the wick tube E, on reaching the top edge of which after certain exposure it is decomposed and igniting, forms a train to convey the flame to the reservoir, thereby producing explosion. That such action in the ordinary construction of lamp, takes place, may be proved by observing the track of the creeping fluid and resinous or similar compound often found on the top edge of the wick tube, which resinous compound becoming heated is decomposed and through admixture with oxygen, or air, has its constituent parts converted into gaseous compounds that explode of themselves or ignite and produce explosion as described. Apart from such action however of the fluid there is an obvious danger through accidental ignition by allowing the fluid to be exposed on the exterior of the lamp, as well as waste or loss thereby. Now, by constructing the lamp on my improved form as shown and described, these dangerous liabilities are removed, for, through the introduction of the tube N and chamber M, the camphene cannot by expansion issue through the feed to the exterior of the lamp, as the tube N will carry the expanded fluid off to the chamber M in the manner indicated by arrows Fig. 2, from whence at any time it may be removed by the spout P. Thus it will be seen no expanded fluid is lost and all liability to explosion avoided except by light applied direct to the feed, which, in being situated, as with the branch L, at a considerable distance from the flame, instead, as usually the case, near to it as with K, is less likely, or almost impossible, to occur. Camphene or other similar fluid may therefore be used with perfect safety, as no lodgment of the fluid need ever take place on the exterior, which advantage has long been desired and is through these simple means effectually obtained, thereby reducing if not altogether removing the chances of those fearful accidents and great losses of life which have so repeatedly occurred and have attached to the use of camphene a prejudice or dread, whereas by proper and self-acting preventatives such as described, no risk or danger whatever is incurred.

What I claim as my invention and desire to secure by Letters Patent is,

Constructing lamps with a lower chamber M, or equivalent receptacle thereto, such chamber or receptacle being connected with the reservoir near its top by a tube or passage N, or other similar communication, substantially in the manner and for the purposes set forth.

R. V. DE GUINON.

Witnesses:
S. H. WALES,
R. I. MANN.